(12) United States Patent
Driver et al.

(10) Patent No.: US 7,766,048 B2
(45) Date of Patent: Aug. 3, 2010

(54) INSTALLATION OF CURED IN PLACE LINERS WITH AIR AND FLOW-THROUGH STEAM TO CURE

(75) Inventors: Franklin Thomas Driver, St. Charles, MO (US); Weiping Wang, Ballwin, MO (US); Joseph M. Coyne, St. Charles, MO (US)

(73) Assignee: INA Acquisition Corp., Wilmington, DE (US)

( * ) Notice: Subject to any disclaimer, the term of this patent is extended or adjusted under 35 U.S.C. 154(b) by 1285 days.

(21) Appl. No.: 11/264,709

(22) Filed: Nov. 1, 2005

(65) Prior Publication Data

US 2006/0090804 A1 May 4, 2006

Related U.S. Application Data

(60) Provisional application No. 60/624,841, filed on Nov. 3, 2004.

(51) Int. Cl.
*F16L 55/16* (2006.01)
(52) U.S. Cl. .................. 138/98; 138/97; 405/184.2; 405/150.1; 156/287; 156/294; 156/269
(58) Field of Classification Search .................. 138/98, 138/97; 264/269, 36.17; 156/287; 405/150.1
See application file for complete search history.

(56) References Cited

U.S. PATENT DOCUMENTS

| | | | |
|---|---|---|---|
| 4,456,401 A | 6/1984 | Williams | 405/150.1 |
| 4,714,095 A | 12/1987 | Muller et al. | 138/98 |
| 4,786,345 A | 11/1988 | Wood et al. | 156/156 |
| 5,186,987 A | 2/1993 | Imoto et al. | |
| 5,653,555 A | 8/1997 | Catallo | 405/184.2 |
| 5,778,938 A | 7/1998 | Chick et al. | 138/98 |
| 6,270,259 B1 | 8/2001 | Burton | 384/213 |
| 6,390,795 B1 * | 5/2002 | Waring et al. | 425/11 |

(Continued)

FOREIGN PATENT DOCUMENTS

EP    0 403 133 A    12/1990

(Continued)

OTHER PUBLICATIONS

International Search Report (PCT/US2005/039470).

*Primary Examiner*—Patrick F Brinson
(74) *Attorney, Agent, or Firm*—Senniger Powers LLP (57) ABSTRACT

A process for lining an existing pipeline or conduit with a flexible resin impregnated cured in place liner by pulling in the liner and inflating a resin impregnated inflation bladder with air and curing the liner with flow-through steam without loss of pressure is provided. The liner includes a resin absorbent material in tubular form with an impermeable membrane forming an outer layer. The inflation bladder also includes a resin absorbent material in tubular form with an impermeable membrane forming an outer layer and an exhaust assembly at the trailing end and is passed through a pressurized inversion apparatus into the collapsed liner. As the bladder reaches the distal end, the exhaust assembly exits the everting bladder and is coupled to an exhaust hose. Steam is then introduced the inversion apparatus to cure the resin and is exhausted through the exhaust tube. After cure, steam is replaced with air to cool the liner and the ends are cut to restore service through the host pipe.

18 Claims, 8 Drawing Sheets

U.S. PATENT DOCUMENTS

| | | | |
|---|---|---|---|
| 6,612,340 B1 | 9/2003 | Lause | 138/98 |
| 6,679,293 B2 | 1/2004 | Driver | |
| 6,708,728 B2 | 3/2004 | Driver et al. | |
| 6,708,729 B1 | 3/2004 | Smith | |
| 6,732,763 B2 | 5/2004 | Williamson et al. | |
| 6,942,426 B1* | 9/2005 | Kampbell et al. | 405/184.2 |
| 2003/0113489 A1 | 6/2003 | Smith | 428/34.5 |
| 2003/0209823 A1* | 11/2003 | Waring et al. | 264/36.17 |
| 2007/0209726 A1 | 9/2007 | Driver et al. | |

FOREIGN PATENT DOCUMENTS

| | | |
|---|---|---|
| EP | 0 542 639 A | 5/1993 |
| GB | 1601234 A | 10/1981 |
| JP | 02078528 A | 3/1990 |
| JP | 03047733 A | 2/1991 |
| JP | 200343609 A | 12/2000 |
| JP | 2001047512 A | 2/2001 |
| WO | WO 90/11175 A | 10/1990 |
| WO | WO 91/18234 A | 11/1991 |
| WO | WO 98/31964 A | 7/1998 |
| WO | WO 99/50585 A | 10/1999 |
| WO | WO 01/77569 A | 10/2001 |
| WO | WO 02/064351 A | 8/2002 |
| WO | WO 03/038331 A | 5/2003 |

\* cited by examiner

INSTALLATION OF CURED IN PLACE LINERS WITH AIR AND FLOW-THROUGH STEAM TO CURE

CROSS-REFERENCE TO RELATED APPLICATION

This application is based on and claims the benefit of co-pending provisional application Ser. No. 60/624,841 filed Nov. 3, 2004.

BACKGROUND OF THE INVENTION

This invention relates to installation of a cured in place liner by pulling a resin impregnated liner into the existing conduit, and inverting a resin impregnated inflation bladder with air and curing the resin with continuous flow-through of steam without loss of pressure and to the apparatuses for practicing the method. The method and apparatuses are particularly well suited for installing medium to large diameter cured in place liners.

It is generally well known that conduits or pipelines, particularly underground pipes, such as sanitary sewer pipes, storm sewer pipes, water lines and gas lines that are employed for conducting fluids frequently require repair due to fluid leakage or deterioration. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or man made vibrations, or other such causes. Regardless of the cause, such leakage is undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor, energy and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process. This Process is described in U.S. Pat. Nos. 4,009,063, 4,064,211 and 4,135,958, all the contents of which are incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. Generally, the liner is installed utilizing an inversion process, as described in the later two identified Insituform patents. In the inversion process, radial pressure applied to the interior of an everted liner presses it against and into engagement with the inner surface of the pipeline. However, the Insituform Process is also practiced by pulling a resin impregnated liner into the conduit by a rope or cable and using a separate fluid impermeable inflation bladder or tube that is everted within the liner to cause the liner to cure against the inner wall of the existing pipeline. Such resin impregnated liners are generally referred to as "cured-in-place-pipes" or "CIPP liners" and the installation is referred to a CIPP installation.

The CIPP flexible tubular liners have an outer smooth layer of relatively flexible, substantially impermeable polymer coating the outside of the liner in its initial state. When everted, this impermeable layer ends up on the inside of the liner after the liner is everted during installation. As the flexible liner is installed in place within the pipeline, the pipeline is pressurized from within, preferably utilizing an inversion fluid, such as water or air to force the liner radially outwardly to engage and conform to the interior surface of the existing pipeline.

Typically, an inversion tower is erected at the installation site to provide the needed pressure head to evert the liner or a bladder. Alternately, an inversion unit as shown and described in U.S. Pat. Nos. 5,154,936, 5,167,901 (RE 35,944) and U.S. Pat. No. 5,597,353, the contents of which are incorporated herein by reference. Cure may be initiated by introduction of hot water into the everted liner through a recirculation hose attached to the end of the everting liner. Inversion water is recirculated through a heat source such as a boiler or heat exchanger and returned to the inverted liner until cure of the liner is complete. The resin impregnated into the impregnable material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

When tubular cured in place liners are installed by the pull in and inflate method, the liner is impregnated with resin in the same manner as the inversion process and positioned within the existing pipeline in a collapsed state. A downtube, inflation pipe or conduit having an elbow at the lower end typically is positioned within an existing manhole or access point and an everting bladder is passed through the downtube, opened up and cuffed back over the mouth of the horizontal portion of the elbow. The collapsed liner within the existing conduit is then positioned over and secured to the cuffed back end of the inflation bladder. An everting fluid, such as water, is then fed into the downtube and the water pressure causes the inflation bladder to push out of the horizontal portion of the elbow and cause the collapsed liner to expand against the interior surface of the existing conduit. The inversion of the inflation bladder continues until the bladder reaches and extends into the down stream manhole or second access point. At this time the liner pressed against the interior surface of the existing conduit is allow to cure. Cure is initiated by introduction of hot water into the inflation bladder that is circulated to cause the resin in the impregnated liner to cure.

After the resin in the liner cures, the inflation bladder may be removed or left in place in the cured liner. If the inflation bladder is to be left in place, the bladder will generally be one that has a relatively thin resin impregnable layer on the inside of the impermeable outer layer. In this case, the impregnable layer after inversion will cause the bladder to adhere to the resin impregnated layer of the liner as is well known in the art. At this time, entry into the manhole or access point is required to open the liner to release the water used to inflate the bladder and to cut off the ends extending into the manholes. When the inflation bladder is to be removed, it may be removed by pulling at the evasion end on a holdback rope attached to the trailing end of the inflation bladder used to control the speed of the inversion. This is generally done after puncturing the bladder at the receiving end to release the water used to evert the bladder and initiate the resin cure. Finally, the downtube can then be removed and service can be reconnected through the lined pipeline. If intersecting service connections are present, they would be reopened prior to resumption of service through the lined pipeline.

In the existing water inversion process utilized by the Insituform Process, the liner is everted using cold water. After the liner is fully everted in the existing conduit, heated water is circulated through a lay flat tube connected to the everting face of the liner. The hot water is circulated during the cure cycle. In medium and large diameter lines as the liner diameter increases the volume of water required for inversion increases dramatically. All the water used to inflate the liner—whether everted or pulled-in-and-inflate—must be heated during the heating and cure cycle. In addition, once the cure is complete the cure water must be cooled either by addition of cold water or continued circulation until the cure water is at a temperature that may be released into the down stream conduit after the liner is cut at the end of the conduit or pump out the cure water from the cured liner and haul to an acceptable disposal system.

The major disadvantage to the use of these apparatuses with water is the quantity and availability of the inverting water. Water must be heated typically from 55° F. to 180° F. in order to affect the cure, and then cooled by the addition of more water to 100° F. before being released to an acceptable disposal system.

This disadvantage may be overcome by using air in lieu of water to create the inverting force. Once the impregnated liner is fully inverted, it then can be cured with steam. Although water is necessary to produce steam, the quantity of water in the form of steam is only 5-10% of that required for water inversion, cure and cool down. This means that steam can be used for curing even if water is not readily available on site. This drastic reduction in the quantity of water is the result of the higher energy available from one pound of water in the form of steam versus one pound of heated water. One pound of steam condensing to one pound of water gives off approximately 1000 BTUs while one pound of water gives off only one BTU for each degree in temperature drop. This reduced water requirement plus virtual elimination of the heat up cycle greatly reduces cure cycle and installation time.

With this apparent advantage in using air inversion and steam cure why has the industry been slow to abandon water inversion and hot water cure?

When water is used to invert the resin-impregnated liner, the uninverted portion of the liner from the inverting nose to the inverting apparatus is buoyed up by a force equal to the quantity of water displaced by the liner. In the case of CIPP liners, this mean the effective weight of the liner is substantially reduced, as is the force necessary to pull the uninverted liner forward to the inverting nose. When air is used to create the inverting force, the uninverted liner lies on the bottom of the pipe and the air pressure acting on the inverting nose of the liner must pull the full weight of the liner forward.

Three forces must be over come to invert a CIPP liner no matter what is used to create the inverting energy. These forces are:

1. Force required to invert the liner (turn liner inside out). This force varies by liner thickness, material type and relation of liner thickness to diameter.

2. The force necessary to pull the liner from the inverting apparatus to the inversion nose.

3. The force necessary to pull the liner through the inverting apparatus.

Force number one (1) above is generally the same for both air and water inversions.

Force number two (2) varies greatly between air and water and can limit the length of air inversions. There is limit on how much pressure can be used to invert a liner without adversely affecting the quality of the installed CIPP liner and/or damaging to the existing conduit. A lubricant can be used for both water and air inversion to reduce the required pulling force.

Force number three (3) can vary based on the apparatus design. In most apparatus presently in use, the force required to pull the liner through the apparatus will increase when either or both forces one and two increase. This is caused by the fact that in order to increase available inversion energy, typical apparatus in use today restrict loss of pressurized fluid from the pressure chamber below the liner entry point into the apparatus and the cuff and banded end of the liner being inverted. This restriction is typically accomplished by increasing the air pressure in a pneumatic sphincter gland, or by using a gland that is energized by the inverting fluid. The movement inward in typical cases is restricted by the gland material and compression of the inverting CIPP liner. This in turn causes an increase on the friction between the inverting CIPP liner and gland.

As an alternative, use of steam has been proposed in view of the energy it carries. The use of air to inflate an inflation bladder and flow-through steam has been disclosed in Insituform U.S. Pat. Nos. 6,708,728 and 6,679,293, the contents of which are incorporated herein by reference. The processes disclosed in these recently issued patents utilize pull in and inflate technology and are currently in use for small diameter liners. They provide advantages over water inversion for these size liners. Moreover, use of a purifying canister disclosed in these patents is not suitable for medium and large diameter liners. Medium size liners are those between about 21 and 45 inches in diameter. Large diameters are those in excess of about 45 inches in diameter.

While the existing methods utilizing hot water to cure have various advantages noted above, the shortcomings tend to increase energy and labor costs as well as involving a significant use of water that may have styrene entrained due to the type of resins typically used. Accordingly, it is desirable to provide a rehabilitation method suitable for medium and large diameter CIPP liners, wherein the liner is inflated by a resin impregnated inflation bladder having an integral air/steam exhaust pipe with air and the resin is cured by steam flow-through, to take advantage of the energy available in the steam to provide an installation method which is faster and more efficient economically than various rehabilitation methods currently practiced.

SUMMARY OF THE INVENTION

Generally speaking, in accordance with the invention, a method of rehabilitation of an existing pipeline by pull in and inflate installation of cured in place liners is provided. Air is used to inflate a resin impregnated inflation bladder and the resin in the liner and bladder is cured with flow-through steam without loss of pressure. A resin impregnated liner is pulled into the existing pipeline to be repaired and cut at the ends to extend beyond the pipeline. An inflation bladder having a layer of resin impregnable material coated with an impermeable coating is fitted with an exhaust at the tail end. The exhaust includes an open end with a holdback attachment. The opposite or leading end with a capped end with a steam valve is inserted into the trailing end of the inflation bladder that is banded to the trailing or hold-back end of the inflation bladder.

A hold-back rope and perforated lay flat hose are attached to the hold-back attachment. The resin impregnated liner is pulled into the host pipe. The inflation bladder is pulled through a pressurized inversion chamber with an inversion boot. The proximal end of the liner is banded over the inflation bladder on the inversion boot. Pressurized air is applied to the inversion chamber valve and inversion air causes the bladder to invert and inflate the pulled-in liner.

Once the exhaust tube is visible at the distal end of the host pipe the inversion is stopped. The perforated lay flat hose is cut and the distal end is attached to a steam hose. A tube end assembly is attached to the proximal end of the liner and the inflation bladder is everted to allow the inflation tube to engage the end assembly, and expose the exhaust when inversion is complete.

An exhaust hose is attached to the distal end of the exposed exhaust. The steam hose connected to the proximal end of the lay flat hose is connected to a boiler. Steam is fed to the lay flat hose to warm the liner and the exhaust valve on the exhaust tube is opened to maintain pressure within the liner. Steam and air flows are maintained until the temperature increases sufficiently and the air is reduced and full steam applied to cure the resin. At the end of the cure cycle the steam valve is closed slowly and air is added to start cool down. The ends of the liner are cut as in conventional installations.

Accordingly, it is the object of the invention to provide an improved method for rehabilitation of an existing pipeline by the installation of a cured in place liner by pulling in a resin impregnated liner and inflation by everting a resin impregnated bladder utilizing air to evert the inflation bladder.

Another object of the invention is to provide an improved inflation bladder for use in the installation of cured in place liner with an exhaust tube installed at the trailing end of the bladder.

A further object of the invention is to provide an improved method for pull in and inflate installation of a cured in place liner by utilizing flow-through steam to effect cure of the resin.

Still another object of the invention is to provide an improved method of installation of a cured in place liner by pull in and inflate wherein air is used to invert the bladder to inflate the liner and flow-through steam is used to cure the resin in the inflation bladder and pull-in liner.

Still another object of the invention is to provide an exhaust installed in the trailing end of an inflation bladder to allow for exhaust of air and steam flowing through the inflation bladder and liner.

Yet another object of the invention is to provide an improved method of an installation of cured in place liners by curing with steam using a perforated lay flat tube tied to the trailing end of the inflation bladder to provide regulated application of steam along the length of the bladder.

Still other objects and advantages of the invention will in part be obvious and will in part be apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, references had to the following description taken in connection with the accompanying drawings in which.

DESCRIPTION OF THE PREFERRED EMBODIMENTS

Figure 1:
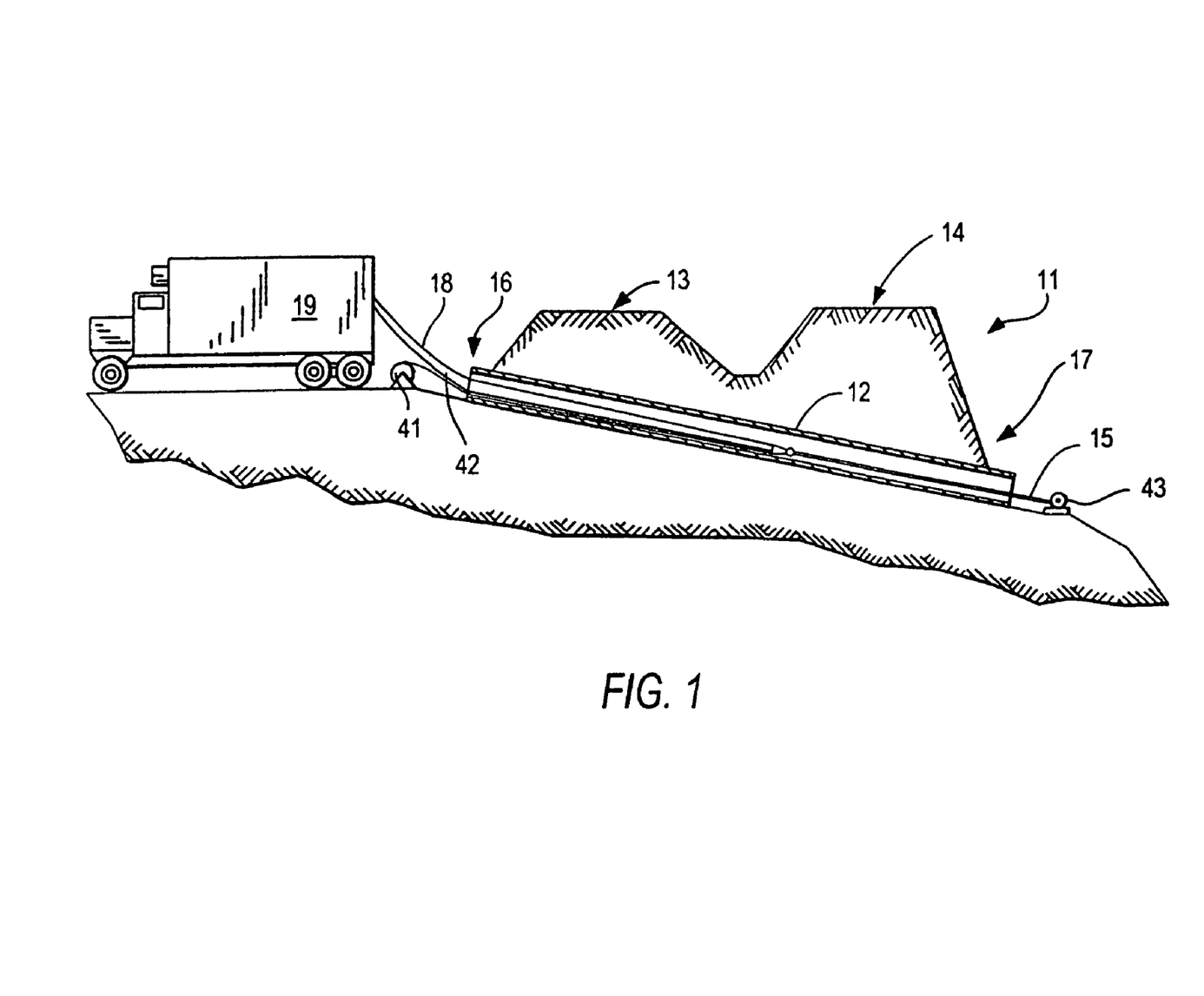
FIG. 1 is a cross-sectional elevational schematic view showing pulling in of a resin impregnated cured in place liner in a typical interstate highway culvert from an upstream or inversion end of the culvert to a downstream or distal end of the culvert at the start of the installation process to line the host pipe.

FIG. 1 shows a typical highway culvert 11 with an existing passageway 12 crossing under highway 13 and 14. FIG. 1 shows an upper opening 16 and FIG. 1 a lower opening 17. A resin impregnated liner is provided at the job site in an appropriately refrigerated truck 19 and is pulled in from a upper opening end 16 by a winch 43 at lower opening end 17. A liner 18 is wrapped with a polypropylene sleeve to prevent damage and control longitudinal stretch.

A flexible cured in place liner of the type generally well known in the art is formed from at least one layer of a flexible resin impregnable material, such as a felt layer having an outer impermeable polymer film layer. The felt layer and film layer are stitched along a seam line to form a tubular liner. A compatible thermoplastic film in a form of a tape or extruded material is placed on or extruded over seam line in order to ensure the impermeability of the liner. Such liners are described in detail in U.S. Pat. Nos. 6,708,728 and 6,679,293.

For larger liner diameters, several layers of felt material may be used. The felt layers may be natural or synthetic flexible resin absorbable materials, such as polyester or acrylic fibers. The impermeable film in the outer layer may be a polyolefin, such as polyethylene or polypropylene, a vinyl polymer, such as polyvinyl chloride, or a polyurethane as is well known in the art. In the initial step in all trenchless rehabilitation installations, the existing pipeline is prepared by cleaning and videotaping.

Figure 2A:
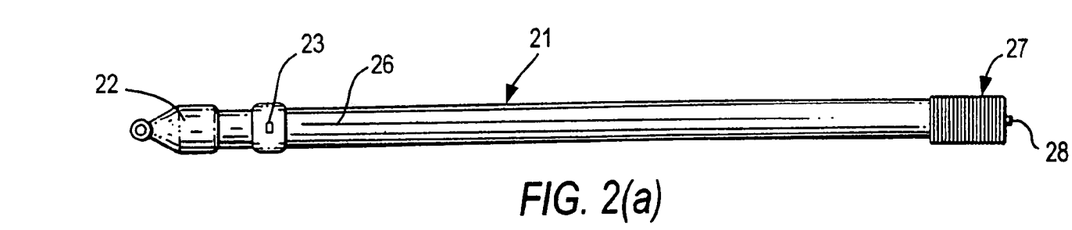
FIGS. 2(a), 2(b) and 2(c) are cross-sectional schematic views of an exhaust assembly as it is installed in a cured in place inflation bladder.
Figure 2B:
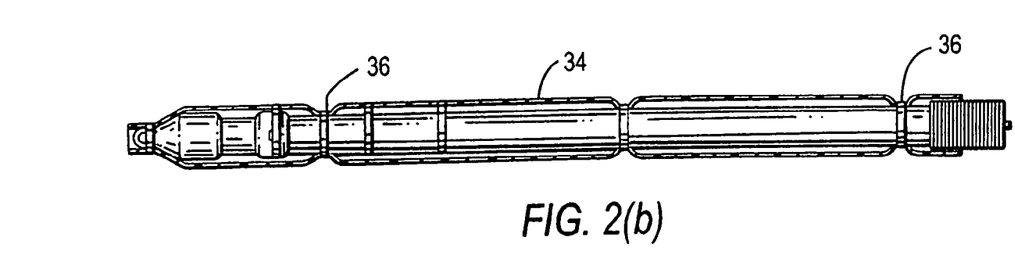
Figure 2C:
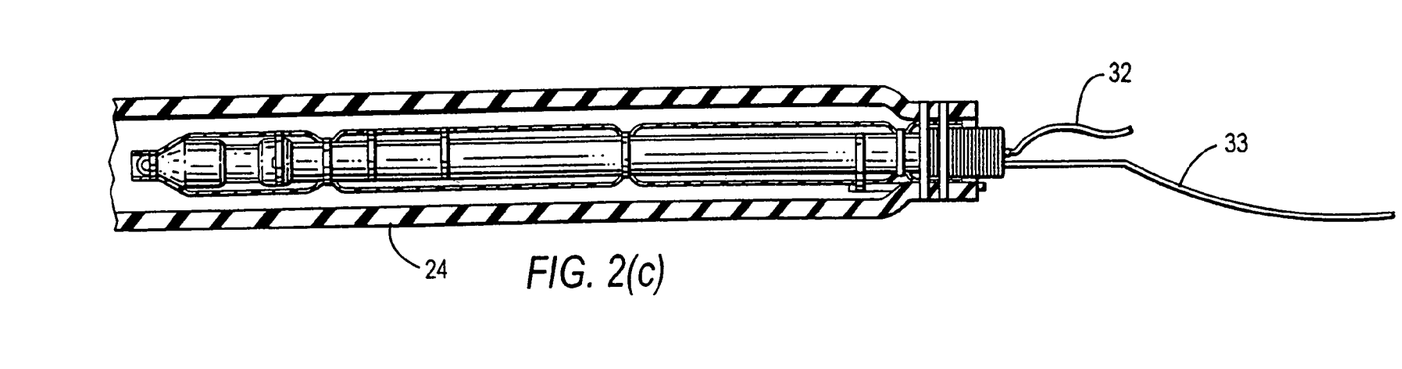

Referring to FIGS. 2(a), 2(b) and 2(c) illustrate an exhaust pipe 21 with a capped end 22 and a steam valve 23 is inserted into an inflation bladder 24 at the tail end. Exhaust pipe 21 is formed from a length of steel jacketed steam hose 26 and includes an open end 27 with a holdback attachment 28. The opposite or a leading end 29 of exhaust pipe 21 is inserted into the trailing end of the inflation bladder 24 as is banded with steel band 31 to the trailing or hold-back end of exhaust pipe 21. Exhaust pipe 21 is covered with a plastic film tube 34 that is tied down with a number of cable ties 36 to prevent tearing of bladder 24.

Figure 3:
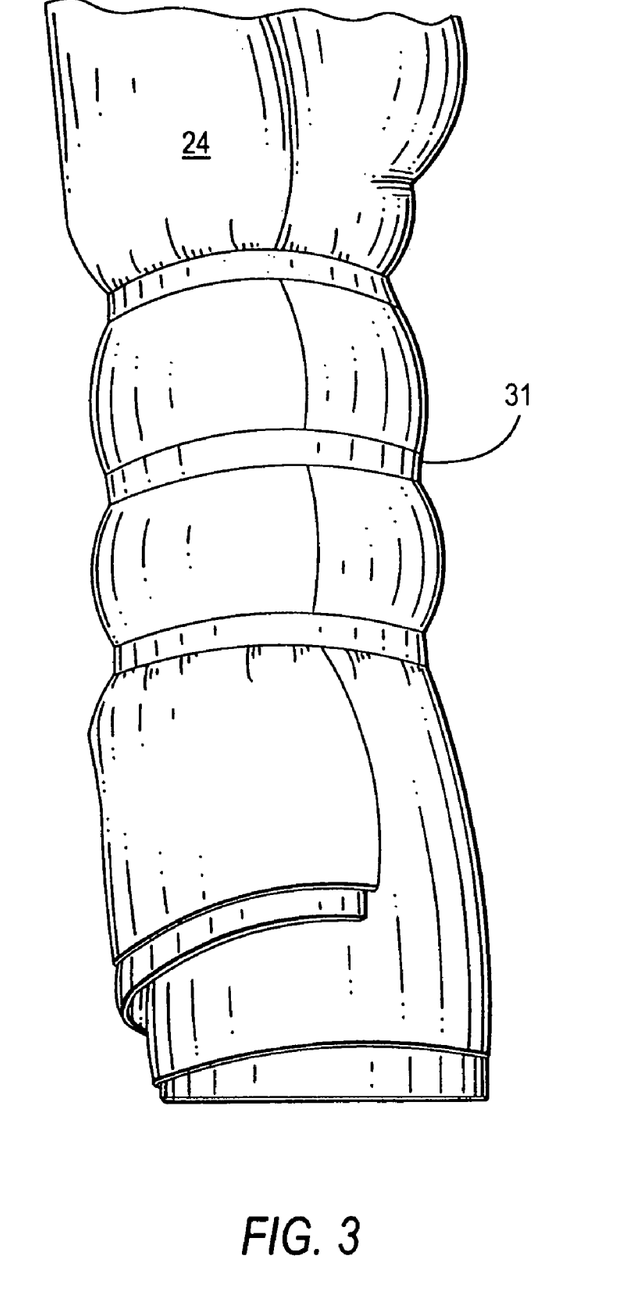
FIG. 3 is a top view of a cured in place inflation bladder banded to the exhaust hose assembly of FIG. 2 in accordance with the invention.

As shown in FIG. 3, capped end 22 of exhaust pipe 21 is inserted into inflation bladder 24 and secured therein with bands 31. A hold back cable 32 is attached to hold back attachment 28. A condensate pipe 33 is also fitted to open end 27 of exhaust pipe 21.

Figure 8A:
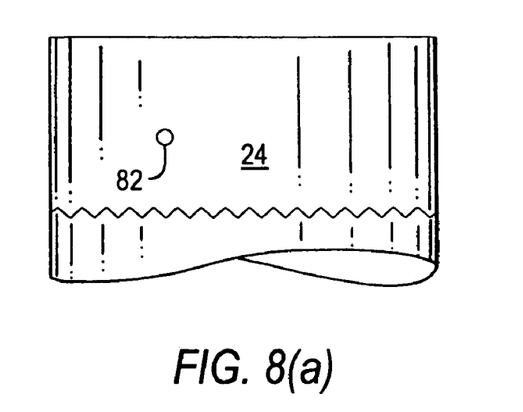
FIGS. 8(a), 8(b) and 8(c) are top views showing the steps to form an air release vent in the cured in place inflation bladder in accordance with the invention.
Figure 8B:
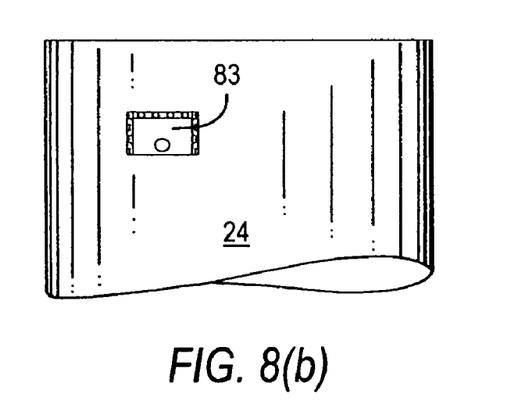
Figure 8C:
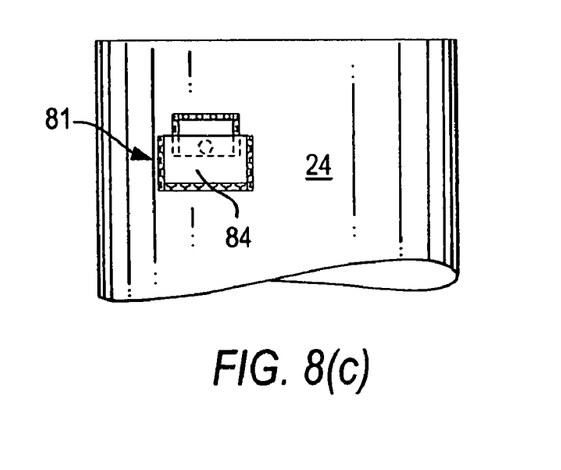

Inflation bladder 24 may also include an air release vent 81 as shown in FIG. 8 formed about 2 to 4 feet from the end of bladder 24. This will allow air in bladder 24 to be expelled before passing through a valve in an inversion apparatus as bladder 24 is being inverted. Vent 81 is formed by cutting a ½ inch hole 82 in the top layer of bladder 24 and covering it with a first patch 83 secured at three sides and overlapping this with a second larger patch 84, also secured on three sides to form vent 81. Patches 83 and 84 are formed of liner material with the impermeable layer on the outside.

Typical dimensions of air release vent 81 are as follows. First patch 83 is about 3 to 6 inches by about 3 to 6 inches and placed over hole 82. Usually, patch 83 is a 3 inch by 5 inch rectangle with the two short edges and distal longer edge secured to out layer of bladder 24. Second patch 84 needs to be slightly larger and may be from about 4 to 7 inches by about 4 to 7 inches. Typically, patch 84 is 4 inches by 6 inches with the two short edges and longer edge at the proximal size secured fixed to outer coating of bladder 24.

Prior to commencing installation pursuant to the method in accordance with the invention, a curable thermosetting resin is impregnated into the felt of liner 18 by a process referred to as "wet-out." The wet-out process generally involves injecting resin into the felt layer through the end or an opening formed in the impermeable film layer, drawing a vacuum and passing the impregnated liner through nip rollers as is well known in the lining art. One such procedure of this vacuum impregnation is described in Insituform U.S. Pat. No. 4,366,012, the contents of which are incorporated herein by reference. A wide variety of resins may be used, such as polyester, vinyl esters, epoxy resins and the like, which may be modified as desired. It is preferable to utilize a resin that is relatively stable at room temperature, but which cures readily when heated.

Impregnated liner 18 is placed about 20 feet from upper opening 16 to lower opening end 17 of host pipe 12. A rope or cable 15 is threaded from upper opening end 16 to lower operating end 17. Cable 15 is then attached to a pull-in winch 43 this is pulled to the upper opening end 16.

A roll 41 of polypropylene 42 or other suitable plastic film or sleeve is placed under and wrapped about pull-in liner 18 as it enters host pipe 12. Sleeve 20 is folded over liner 18 and banded or taped to protect liner 18 as it is pulled into host pipe 12 by winch 43. Pull in of liner 18 is continued until distal end 18b of liner 18 is a desired distance from the end of host pipe 12. Openings 18c are formed in distal end 18b to assist in determining the exact position of exhaust 21.

Figure 4:
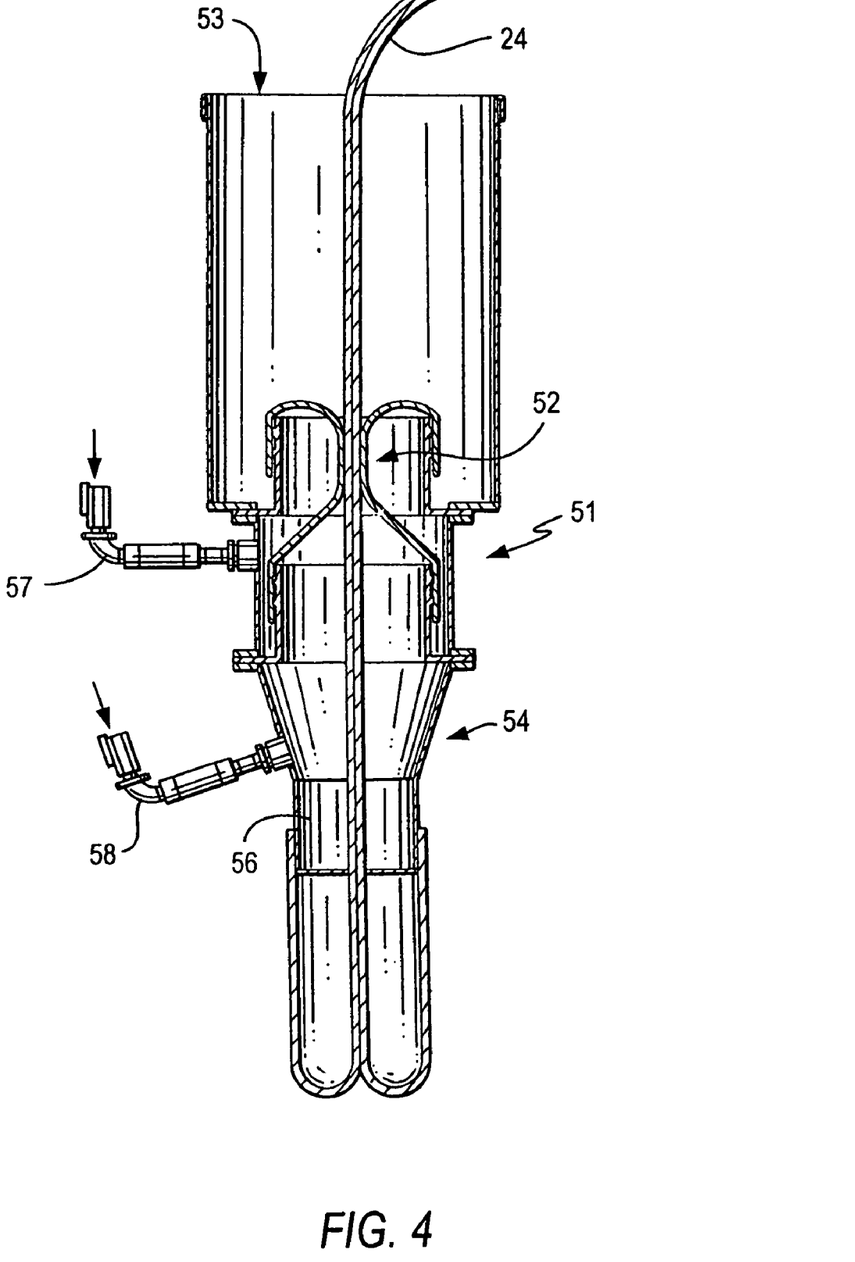
FIG. 4 is a cross-sectional schematic view of a pressurized inversion unit for the air inversion of the inflation bladder of FIG. 3 in accordance with the invention.

Bladder 24 is inverted into liner 18 with an air inversion unit. In this embodiment, an inversion unit 51 having at least one valve or gland for engaging bladder 24 as it is inverted with air. Unit 51 includes at least one sphincter valve 52 of the type shown in U.S. Pat. No. 5,154,936 and is positioned at the trailing end of pull-in liner 18. Unit 51 includes an inlet end 53 and an outlet end 54 with an inversion boot 56 to fit the diameter of inflation bladder 24. Air is injected into a valve air inlet 57 to operate valve 52 and engage bladder 24. Inversion boot 56 includes an inversion air inlet 58 for injecting air to control the inversion of inflation bladder 24.

Inflation bladder 24 is folded and pulled through inversion unit 51 until sufficiently passed the face of banding boot 56. Bladder 24 is then folded over boot 56 and securely banded thereon. Pull-in liner 18 is then banded to inversion boot 56 over banded inflation bladder 24. Inversion air hoses for operation of sphincter valve 52 of inversion apparatus 51 and the inversion of inflation bladder 24 are connected to inversion unit 51.

In the conventional pull in and inflate installation process utilizing a water inversion process, pressure within the bladder and liner is maintained due to the height of the water column within the downtube. Cure is initiated by exposing the impregnated liner to heat. This is usually accomplished by introducing heated water into the inversion pipe or by circulating hot water through a recirculation hose pulled into the inverting bladder by a hold back rope connected to the trailing end of the inverting bladder. Generally, cure using hot water takes between about 3 to 5 hours depending on the type of resin selected and the thickness of the liner. After cure, entry into the downstream manhole is necessary to release the heated water after cure prior to removal of the inflation bladder.

For medium and large diameter liners this presents significant problems, especially when relining a typical highway culvert having a significant incline as shown in FIG. 1. Not only is a large volume of water required, but the added pressure from the vertical drop would rupture an inflation bladder. To avoid this, the use of air to inflate and steam to cure is desirable. In addition the energy carried by the steam will cure the line faster and at a lower energy cost.

For example, the following TABLE I shows a comparison of energy and water requirements for water versus steam cure of 114 feet of a 42 inch diameter cured in place pipe with a 9.5 foot downtube and 3.5 feet at the downstream end.

TABLE I

Comparison of Energy & Water requirements for Steam Cure and Water Cure for CIPP.
114.1 feet of 42" diameter CMP (101 CMP + 9.6 ft downtube + 3.5 downstream end
Ground temperature 60 degrees F. no ground water

| Water inversion and Cure | | Air Inversion and Steam Cure | |
|---|---|---|---|
| | | 108 ft × 39.67 #/ft Resin | 4284 |
| Water in lbs. | 68,501 | Steam required in lbs. @1.5 lbs resin per lb. of steam | 2856 |
| | | Estimate Gallon of water | 342 |
| Water in gallons | 8,208 | Actual Gallon used | 225 |
| Water Temp. | 55 | Actual lbs. of Steam used | 1878 |
| Cure Temp | 180 | | |
| Temp Diff. | 125 | | |
| BTUs Required to | 8,562,631 | | |

TABLE I-continued

Comparison of Energy & Water requirements for Steam Cure
and Water Cure for CIPP.
114.1 feet of 42" diameter CMP (101 CMP + 9.6 ft
downtube + 3.5 downstream end
Ground temperature 60 degrees F. no ground water

| Water inversion and Cure | | Air Inversion and Steam Cure | |
|---|---|---|---|
| Heat up water | | | |
| Heat up time with 5 million BTU boilers in hours | 2.4 | | |
| Cure Time: one boiler @ 3.5 million intermittant firing (20% of the time) in hours | 2.5 | | |
| BTU required to Cure | 1,750,000 | | |
| Estimated Total BTUs | 10,312,631 | BTU used for Steam Cure | 1,821,362 |
| Total Heat-up & Cure | 5 Hours* | Total Heat-up & Cure | 3 Hours* |

1. The Air Invert Steam cure used 2.7% of the water used for water inversion; 225 gallon vs. 8,208 gallons. (Note this does not include water added for cool down in most water inversions)
2. The Air Invert Steam Cure used 17.7% of the energy used for hot water cure (1,821,362 BTUs for Steam cue vs. 10,312,631 BTUs for hot water cure).
3. Heat-up and Cure cycle for Steam Cure was 60% of Hot Water Cure.

FIG. 4 illustrates typical tube inversion apparatus 51 of the type disclosed in U.S. Pat. No. 5,154,936, the contents of which are incorporated herein by reference to be used in accordance with a preferred embodiment of the invention. The inversion apparatus 51 may be mounted horizontally at the upstream end of the host pipe. Various connectors as shown in the '936 patent are mounted on apparatus 51 to allow for introduction of air to operate sphincter valve 52 and supply inversion air to the interior of inflation bladder 24 and steam to effect the cure of the resin in bladder 24 and liner 18.

The inflation bladder 24 is fed through the inversion apparatus 51 and banded at the inversion end. The exposed upstream end of liner 18 is banded over bladder 24. Valve 52 is pressurized and bladder 24 is inverted into liner 18. Air pressure is applied to the air inlet sufficient to effect the inversion. Lubricant is applied to the surface of the bladder 24 as it is fed in to facilitate movement through the gland during the inversion of the bladder 24.

The inversion air supply and bladder pressure is adjusted to maintain a uniform inversion rate. The recommended pressures are:

| | Dia | | | |
|---|---|---|---|---|
| | 36" | 42" | 48" | 54" |
| Psig | 4.0 | 3.5 | 3.0 | 2.5 |

As inflation bladder 24 passes through inversion apparatus 51 and the hold back end approaches apparatus 51, a perforated lay flat hose 71 for introduction of steam is attached to hold back attachment 28. Care is exercised as hold back attachment 28, hold back cable 32 and lay flat hose 71 enter inversion apparatus 51.

Generally, lay flat hose 71 is any flexible hose material that will withstand steam temperatures at minimal pressures, such as a rubber. Suitable rubbers include Viton rubber, EPDM rubber and reinforced nitrile coated polyester hose material. Such hoses should be oil and weather resistant. Typically, lay flat hose 71 is a 4" diameter hose. However, 3" & 2" diameter are suitable for use in air inversion steam cure installations in accordance with the invention. There is no observable reduction of the physical properties of a nitrile coated polyester reinforced hose after being used with steam. This hose is not used to carry steam on its own, but is used within another tube/liner and therefore the pressure in the lay flat hose is subject to is the difference between the manifold delivery pressure and the internal pressure of the tube/liner being cured. This pressure differential typically ranges between about 1.5 psi at the start of cure to 0.5 psi near the end of the cure cycle.

Lay flat hose 71 is perforated with holes in a prescribed pattern and closed at the distal end. These perforated holes create high velocity steam jets and turbulence in the radial direction to reduce temperature gradient within the inverted liner during cure and promotes heat transfer regardless of the position or rotation of lay flat hose 71. Perforated hole sizes may range from 1/16 to 1/4" in diameter depending on host pipe diameter and length of host pipe being lined. A repeating pattern of two holes, oriented on opposite sides of the lay flat hose, and spaced 4" to 12" apart longitudinally, is applied to the entire length of the lay flat hose. Hole size is selected such that there will be steam jets with sufficient velocity along the entire length of lay flat hose and the combined volumetric flow of all of the steam jets matches the steam boiler capacity.

Three meaningful objectives are achieved by using lay flat in the installation and cure of CIPP tube as described above.

1. The steam energy is injected along the entire bottom length of the CIPP tube, which prevents temperature stratification from the proximal end to the distal end.

2. The actual quantity of steam injected from each hole decreases as the distance of the hole from the proximal end increases. This means that the average resident time of the injected steam is optimized to cure the CIPP tube.

3. The location of the lay flat insures that the bottom of the CIPP tube will be cured even if condensate collects in sagging areas of the host pipe. The 200° F. external temperature of the lay flat hose and perforated steam holes injecting steam into the condensate ensure an effective cure.

Supplying steam to the curing liner in this manner greatly improves the efficiency of cure in terms of pounds of resin cured per pound of steam injected into the CIPP tube during the cure cycle. The even distribution of energy along the length of the tube also results in uniform start of exotherm from top to bottom and proximal to distal ends of the tube.

Figure 5:
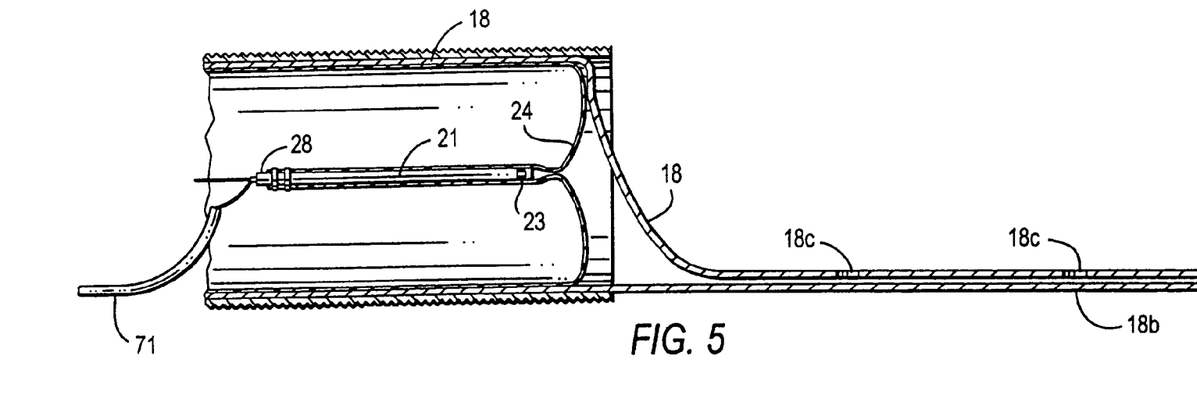
FIG. 5 is a cross-section schematic of the averting face of the inflation bladder at the distal end of the host pipe during an installation with inspection flaps to locate the position of the exhaust tube in accordance with the invention.
Figure 6A:
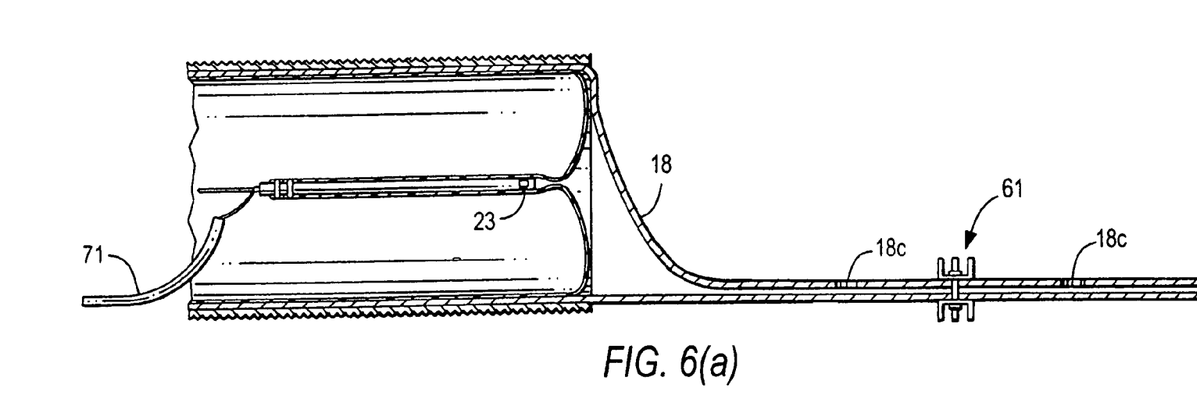
FIG. 6(a) is a cross-section schematic of the averting face of the inflation bladder at the distal end of the host pipe as in FIG. 5 with an end closure frame in place and FIG. 6(b) is a cross-sectional of the inflation bladder fully inverted with exhaust assembly extending through the end closure frame of FIG. 7(a)
Figure 6B:
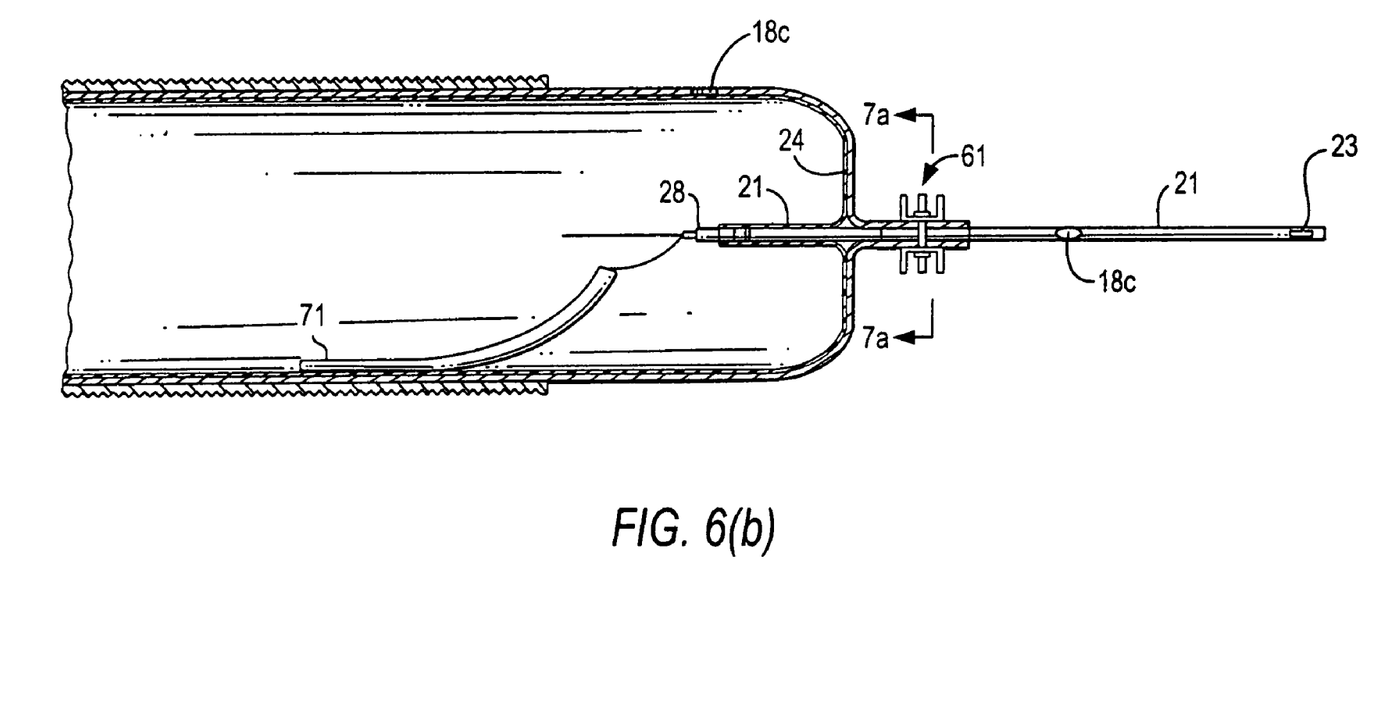
Figure 7A:
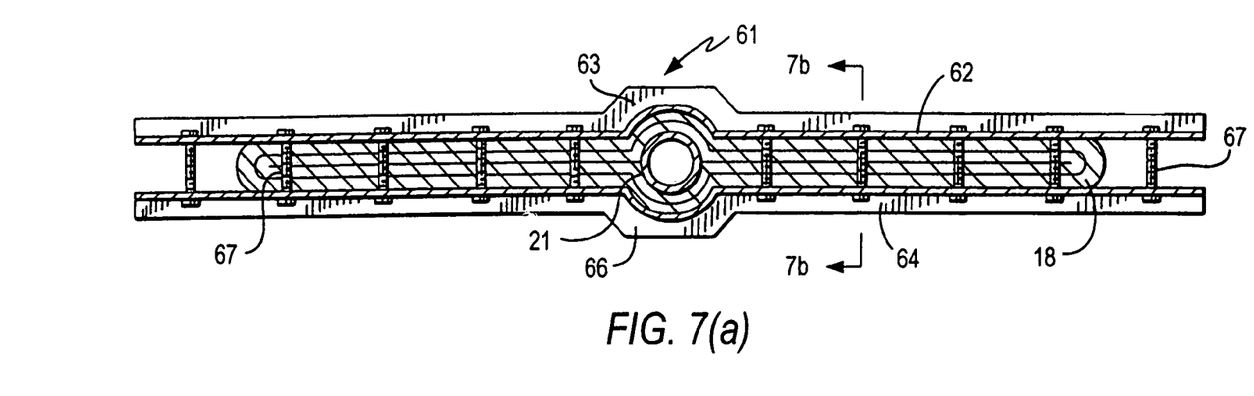
FIG. 7(a) is a cross-section of the end closure frame of FIG. 6(b) taken along line 7a-7a and FIG. 7(b) is a section along line 7b7b.
Figure 7B:
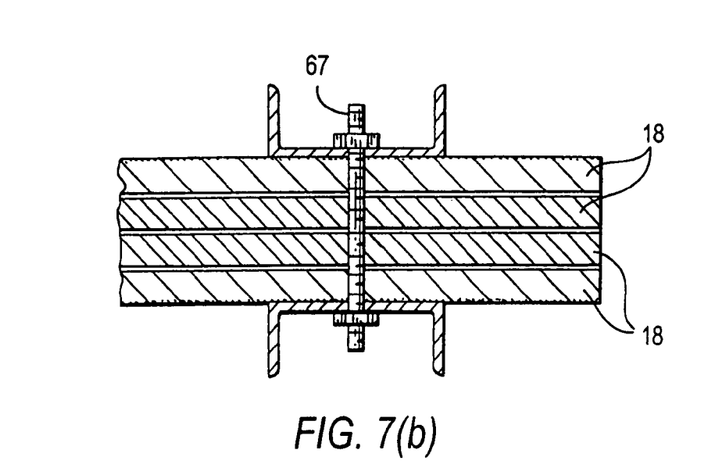

When the inversion of inflation bladder 24 continues and approaches determined lower opening end 17, exhaust pipe 21 begins to exit the inverting face. The exact position may be determined by cutting inspection openings 18c in distal end 18b of liner extending from lower opening end 17. This is illustrated in more detail in FIG. 5. Air pressure in inflation bladder 24 is maintained when the inversion is stopped. At this time, exhaust pipe 21 is directed to an end closure assembly 61 as shown in FIG. 6(a). FIG. 6(b) shows the inflation bladder 24 fully inverted with exhaust pipe 21 extending through the end closure assembly 61 of FIG. 7(a). The details of assembly 61 are shown in FIGS. 7(a) and 7(b). The inversion is continued until the inflation bladder 24 is stopped by closure assembly 61 and the exhaust pipe 21 is engaged in closure assembly 61.

Closure assembly 61 includes an upper flat clamp 62 with an enlarged central region 63 and a cooperating lower flat clamp 64 with an enlarged central region 66 for engaging exhaust pipe 21 as it exits lower opening 17. Both upper clamp 62 and lower clamp 64 are secured together about the distal end of liner 18 by a number of bolts 67.

At this time steam is introduced into attached perforated lay flat hose 71 to initiate cure of the resin in pull-in liner 18 and inflation bladder 24. In an exemplary embodiment of the invention, lay flat hose 71 is a high temperature thermoplastic tube 4 inches in diameter. One-eighth inch orifices are drilled at one foot intervals at one-half inch from the folded edges at opposite folds. This orifice pattern provides more steam at the proximal end and ensures good mixing even if hose 71 rotates during installation. Steam is provided from a steam inlet hose that is regulated by a valve manifold to provide an air/steam mixture to the inlet line for providing steam. The air/steam flow is adjusted to maintain a curing pressure of about 3-6 psi until the combined air/steam flow temperatures reach a desired temperature of about 170-220° F. measured at the exhaust tube.

The recommended warm up and cure pressures in psig are as follows:

|  | Tube DR | | | | |
| --- | --- | --- | --- | --- | --- |
|  | 50 | 60 | 70 | 80 | 90 |
| Warm-up Psig | 6.0 | 5.0 | 4.2 | 3.7 | 3.3 |
| Cure Psig | 6.0 | 5.0 | 4.2 | 3.7 | 3.3 |

Depending upon the particular resin and tube thickness, once the cure is complete, steam flow is turned off while simultaneously adjusting the air flow to maintain cure pressured. The exhaust valve is adjusted while cooling to about 130° F. at the six o'clock position for at least up to one hour.

Once the temperature has cooled to the desired level, air flow pressure is reduced to zero, the exhaust valve is fully opened. Any condensate that may have accumulated in bladder 24 is removed by condensate drain 33 on the exhaust assembly 21.

The air inversion and steam cure installation of Cured In Place Pipe (CIPP) liners described herein is a cost effective and efficient method for installing and curing medium to large diameter (18"-84") liners. Use of steam to cure without deflating the inverted liner requires procedures that differ greatly from the more typical hot water cure of these same diameter CIPP liners. In procedures using hot water cure, typically the hot water is recirculated to the boiler. In contrast, steam cures uses a single pass flow through method in order to avoid condensation and loss of pressure. Such condensation also causes cool regions at the bottom of the liner and fails to provide the energy needed for cure. The use of steam cure for medium and large diameter CIPP liners also requires different technology than that used for steam cure of small diameter (6"-15") CIPP liners.

When properly used, steam is a much more environmentally friendly cure method than water in that it uses only about 5% of the water and between about 15 to 30% of the energy that would be used in a hot water cure. Earlier attempts to extend the use of steam cure of CIPP liners to diameters 18" and above has often resulted in incomplete cures to the lower portion of the installed CIPP liner. Attempts at overcoming this cure problem by using large volumes of steam and/or steam and air have been only marginally successful. In addition, introduction of large volumes of steam tend to extend cure cycle time and increased energy usage. Even with the extended cure cycle and additional energy, effective cure under certain field conditions is difficult to achieve. It is believed that this has been due to thermal stratification and the presence of areas of condensation that collects in low sections of the pipe and curing liner. The collected condensate insulates and prevents heat transfer to the resin laminate from the steam blanket above.

Hot water cure of medium to large diameter CIPP liners typically requires between about 1500 to 2500 BTUs per pound of resin cured. In contrast, small diameter steam cured liners (6"-12") require about 700 to 1000 BTUs per pound of resin cured.

The methods described consistently achieving a complete CIPP cure with about 300 to 500 BTUs per pound of resin even with areas of ponded condensate present in the bottom of the CIPP liner. This is possible because of the use of a steam injection method that controls the steam injection locations to eliminate thermal stratification and the adverse effect on cure of ponded condensate. The method also controls the quantity and location of steam injection along the length of the CIPP liner to maximize the heat transfer from each pound of steam to the resin felt laminate before it is exhausted from the far end of the CIPP liner as condensate or water vapor.

As described herein, steam is injected into a closed end hose, which lays in the invert of the expanded CIPP liner. An independent exhaust port(s) with a control valve is provided to control the exhaust of water vapor and condensate from the distal end of the CIPP liner. The hose contains a number of orifices (sized and spaced) spaced along the full length of the hose. The location of the orifices around the hose circumference are designed so that no matter how the hose may rotate during placement in the CIPP liner, a number of orifices along the length of the hose will be directed toward the bottom of the CIPP liner. This creates a continuous injection of steam into any ponded condensate through out the cure cycle. The steam injection into the condensate heats the condensate above the temperature necessary to assure cure.

The closed end on the steam injection hose allows the injected hose internal pressure to be higher than the internal cure pressure of the CIPP liner. As the injected steam moves through the length of the hose it is forced out through the orifices forming a steam blanket within the CIPP liner. The differential in internal pressure between the steam injection hose and the CIPP internal pressure lessens as the steam move away from the injection end of the steam injection hose. Therefore, the volume of steam injected from each orifice decreases along the length of the steam injection hose.

This accomplishes three things:

1. Increase in the residence time that the majority of the steam is available inside the CIPP liner to maximize energy transfer to the resin felt laminate.
2. Continually adds additional energy to the steam blanket as it moves toward the exhaust end of the CIPP liner keeping the rate of energy transfer higher.
3. The steam injection into the steam blanket also causes turbulence, which eliminates thermal stratification, and increases energy transfer.

Knowing the physical properties of the CIPP liner (diameter, length, thickness, resin and catalyst system) and available boiler output in BTUs per hour permits the adjustment of orifice size to match boiler output in pounds of steam per hour with recommended cure cycle time.

It can readily be seen that the process in accordance with the invention readily allows one to attain the advantage of curing a resin liner with flow through steam. By practicing the process, a tubular member can be easily everted through an existing pipeline. By providing an selectively openable exhaust valve and exhaust tube at the trailing end of the everting inflation bladder, pressure can be maintained within the bladder and inflated liner and steam can be introduced at the inversion access and flow through the curing liner to utilize the higher energy available in the steam to cure the resin significantly faster than one can cure utilizing circulating hot water.

It will thus be seen that the objects set fort above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A method of rehabilitating an existing pipeline, the method comprising:
   securing a perforated lay flat hose to a supply of flexible resin impregnated lining tube;
   extending the lining tube into the existing pipeline from a first access point to a second access point by inverting the lining tube, the inverting being conducted so that the perforated lay flat hose is pulled into the existing pipeline by the lining tube during the inversion;
   introducing steam into the lay flat hose and the interior of the inverted lining tube and allowing the steam to flow out of the lining tube through an exhaust at the second access point; and
   allowing the resin in the impregnated lining tube to cure.

2. The method of claim 1, wherein the exhaust comprises a tube having a capped end and a selectively openable valve at the capped end and an open end, the capped end and valve being outside the lining tube and the open end being in fluid communication with an interior space of the lining tube when the steam flows through the exhaust.

3. The method of claim 2, further comprising securing the exhaust tube to a trailing end of the lining tube and using the lining tube to pull the exhaust tube to the second access point during the step of extending the lining to into the existing pipeline.

4. The method of claim 1, further comprising emitting steam from a first of the perforations in the lay flat hose at a first rate and emitting steam from a second of the perforations in the lay flat hose at a second rate different from the first rate.

5. The method of claim 4, wherein the first rate is higher than the second rate and the distance between the first perforation and the first access point is less than the distance between the second perforation and the first access point.

6. The method of claim 4, wherein introducing steam in to the lay flat hose comprises maintaining pressure in the lay flat hose at a pressure that is higher than a pressure in the lining tube so steam is emitted forcefully from the perforations into the lining tube.

7. The method of claim 1, wherein introducing steam into the lay flat hose comprises forming a steam blanket in the lining tube that moves toward the exhaust at the second access point and maintaining turbulence in the steam blanket as the steam blanket flows along the lay flat hose to limit thermal stratification in the lining tube.

8. The method of claim 7, wherein introducing stem into the lay flat hose comprises emitting pressurized steam from the lay flat hose in multiple different radial directions.

9. The method of claim 8, wherein introducing steam into the lay flat hose comprises emitting some pressurized steam from the lay flat hose in a downward direction.

10. The method of claim 7, wherein introducing steam into the lay flay hose comprises emitting steam from the perforations in the lay flat hose in the form of steam jets.

11. The method of claim 1, wherein inverting the lining tube comprises using pressurized air to extend the lining tube into the existing pipeline.

12. The method of claim 1, wherein the lay flat hose has a plurality of perforations distributed longitudinally along the lay flat hose.

13. The method of claim 12, wherein some of the perforations in the lay flay hose are directed toward the bottom of the lining tube during the introduction of steam into the lay flat hose such that steam is directed by the perforations into any condensate pools formed at the bottom of the lining tube.

14. The method of claim 1, including the step of attaching a hold back device to the trailing end of the inverting inflation bladder.

15. The method of claim 1, including the step of attaching a hold back device to the trailing end of the inverting lining tube.

16. The method of claim 1, wherein the existing pipeline has an open end at the first access point and an open end at the second access point.

17. The method of claim 1, wherein the lining tube is an inflatable bladder.

18. A method of rehabilitating an existing pipeline, the method comprising:
   pulling one end of a flexible lining tube into the existing pipeline, the flexible lining tube comprising a resin;
   securing a perforated lay flat hose to an inflatable bladder;
   extending the flexible bladder into the existing pipeline and flexible lining tube from a first access point to a second access point by inverting the flexible bladder, the inverting being conducted so that the perforated lay flat hose is pulled into the existing pipeline by the inflatable bladder during the inversion;
   introducing steam into the lay flat hose and the interior of the inflatable bladder and allowing the steam to flow out of the flexible bladder through an exhaust at the second access point; and
   allowing the resin in the flexible lining tube to cure.

* * * * *